United States Patent

[11] 3,549,134

[72] Inventors  Susanna Mikhailovna Karpacheva,
2 Schukinsky proezd, 2, kv. 88;
Valerian Matveevich Muratov,
Astakhovsky pereulok, ½, kv. 118
Leonid Solomonovich Raginsky,
Nikitinskaya ulitsa, 16, korpus 1, kv. 29;
Valery Alexandrovich Chernov, ulitsa
Dmitrova, 4, kv. 2 and Oleg Antonovich
Khrokalo, Izmailovsky bulvar, 22, kv. 24,
all of Moscow, U.S.S.R.
[21] Appl. No. 736,502
[22] Filed June 12, 1968
[45] Patented Dec. 22, 1970

[54] METHOD AND APPARATUS FOR MIXING AND
DISPERSING A GAS AND A LIQUID
6 Claims, 4 Drawing Figs.

[52] U.S. Cl............................................. 261/74,
261/82
[51] Int. Cl........................................ B01f 11/00
[50] Field of Search............................ 259/4;
261/74, 75, 81, 82, 119

[56] References Cited
UNITED STATES PATENTS
1,526,170 2/1925 Milligan...................... 261/77
2,818,324 12/1957 Thornton..................... 261/81
2,995,497 8/1961 Heden......................... 261/121X
3,323,249 6/1967 Randall....................... 261/121X
2,531,655 11/1950 Thompson................... 261/82X
FOREIGN PATENTS
699,310 5/1950 England..................... 261/81

Primary Examiner—Frank W. Lutter
Assistant Examiner—Steven H. Markowitz
Attorney—Waters, Roditi, Schwartz & Nissen ABSTRACT: A method for mixing and dispersing a gas in a liquid comprises placing the gas above the liquid and imparting to the liquid and the surface of contact thereof with the gas, a reciprocating movement and repeatedly varying the area of the surface of contact of the liquid with the gas during each movement of the liquid. A device for effecting the method comprises a reservoir for the liquid and at least one vessel in the reservoir having a vertical inner cavity with a corrugated wall to provide a cross-sectional area which repeatedly varies along the length of the cavity, the gas being supplied to the top of the vessel through an inlet thereof, the bottom of the vessel being in communication with the reservoir. A pulsator is connected to the vessel to alternately vary the pressure in the liquid and produce reciprocal movement therein.

PATENTED DEC 22 1970    3,549,134

INVENTORS
SUSANNA MIKHAILOVNA KARPACHEVA
VALERIAN MATVEEVICH MURATOV
LEONID SOLOMONOVICH RAGINSKY
VALERY ALEXANDROVICH CHERNOV
OLEG ANTONOVICH KHROKALO

INVENTORS
SUSANNA MIKHAILOVNA KARPACHEVA
VALERIAN MATVEEVICH MURATOV
LEONID SOLOMONVICH RAGINSKY
VALERY ALEXANDROVICH CHERNOV
OLEG ANTONOVICH KHROKALO

METHOD AND APPARATUS FOR MIXING AND DISPERSING A GAS AND A LIQUID

The present invention relates to methods of mixing and dispersing a gas agent and liquid and to devices therefor in the chemical, oil processing and hydrometallurgical fields in processing active, toxic or radioactive reagents when soluting gases, leaching metals by a gas reagent, flotation, etc.

Known in the prior art are methods of mixing and dispersing a gas agent and liquid and a device for the embodiment thereof, wherein the processes of mixing and dispersing are separate and are performed by different members.

Thus, in an aerator, comprising a reservoir and an aeration device, communicating with said reservoir and having the shape of a porous partition, the gas agent is forced through the porous partition under the surface of the liquid in the reservoir. The gas bubbles are mixed in the liquid by means of a mechanical mixer, whose shaft passes through a sealing device in the reservoir.

When using this method of mixing, the size of the gas agent bubbles is difficult to change, as it depends on the constant size of the holes in the porous partition. However, fluctuations of gas consumption are possible due to clogging of the holes in the partition, and increased gas consumption due to insufficiently even mixing of the dispersed gas phase within the whole volume of the reagents. Rotating mechanical units wear out quickly, especially when contacting active reagents, and their replacement presents considerable difficulties in the case of dealing with toxic and radioactive reagents. Besides, leakage of the gaseous reagent and aerosols is possible through the seals.

Such an aerator requires additional expenditures for the replacement of the seals and rotating mechanical parts, as well as for the provision of a reliable system intended for sucking off toxic gases, penetrating into the workshop, and the provision of an appropriate detecting and alarm system.

An object of the present invention is the development of a method of mixing and dispersing of a gas agent and a liquid, and a device for effecting the method which ensures the possibility of stepless and independent adjustment of the degree of dispersing and the amount of the gas agent supplied for the aeration.

Another object of the present invention is the provision of a uniform distribution of the dispersed gas phase throughout the whole volume of the liquid.

Still another object of the present invention is to ensure sealing and provide reliability of the device for mixing and dispersing the gas agent and the liquid in the course of its long-term maintenance.

In accordance with the above mentioned and other object in the method of mixing and dispersing a gas agent and a liquid, the gas agent is placed above the liquid, while the liquid and its surface contacting with the gas agent are made to perform reciprocating movement, and during each movement, the surface area contacting the gas agent is repeatedly changed.

The preferred method of producing the reciprocating movement of the liquid is by periodically changing the pressure of the gas agent.

In order to reduce the power consumption for the production of the reciprocating movement of the liquid, it is expedient to impart such a movement to only a portion of the liquid which is mixed with the rest of the liquid.

In the device intended for the embodiment of the specified method, according to the invention, the aeration arrangement comprises at least one vessel having an inlet at its top portion for the gas agent, said vessel being connected to the pulsator, the cross section area of the inner cavity of said vessel repeatedly changing along its length.

It is also expedient to connect the vessel to the pulsator at its top and to the reservoir at its bottom.

The liquid reservoir can be provided with an additional arrangement for mixing the liquid aerated in the vessel with the rest of the liquid in the reservoir.

The method of mixing and dispersing the gas agent and liquid and the device for effecting the method ensure the possibility of changing, within a wide range, the size of the gas bubbles in the liquid depending on the process requirements, the degree of dispersion being independent on the consumption of the reagents. This allows conducting the process at the most advantageous parameters of the gas-liquid emulsion (size of bubbles and phase ratio) and considerably reduces the consumption of the gas agent. A high degree of gas dispersion and its even distribution throughout the whole volume of the liquid or pulp are achieved without the employment of any mechanical rotating parts. This sharply increases the reliability of the device.

Other objects and advantages of the present invention will become apparent hereinbelow from the description of several examplary embodiments thereof with reference to the accompanying drawings wherein:

FIG. 1 diagrammatically shows a device for mixing and dispersing a gas agent and liquid, according to the present invention;

FIG. 2 diagrammatically shows another embodiment, according to the present invention;

Figure 1:
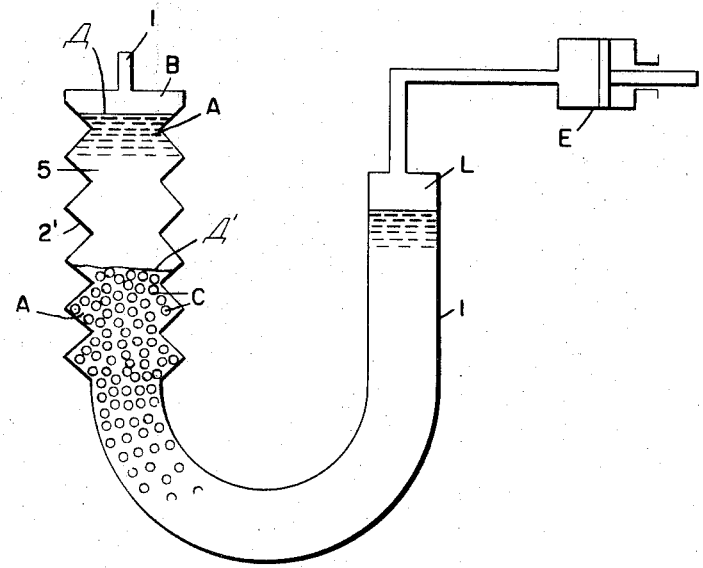

According to the method specified herein the mixing and dispersing of the gas agent and liquid is effected as follows.

Reciprocating movement in a vertical plane is imparted to a liquid A (FIG. 1), a gas agent B being above the surface thereof, and during each movement a surface D of the liquid in contact with the gas agent is repeatedly changed. Sharp displacement of the liquid A in the vertical plane accompanied by the change of the surface $D_1$ of its contact with the gas agent causes liquid splashing from the periphery of the meniscus to its center (or vice versa), resulting in contact of the gas agent B with the surface $D_1$ of the liquid which becomes covered with a liquid layer. Large-size bubbles C of the gas agent B thus formed appear in the zone of intensive turbulence of the moving liquid owing to different values and directions of the speeds of the liquid movement in the center and periphery of the meniscus. Here these bubbles break up quickly to a size, determined by the speed of the liquid movement. The fine bubbles of gas agent thus formed have a lower speed of travel to the surface, the smaller their diameter, therefore in the process of reciprocating movement of the liquid the number of bubbles C increases quickly and the whole volume of the liquid in the aeration vessel appears to be filled with the gas phase bubbles.

By changing the speed of the liquid reciprocating movement it is possible to increase or reduce the degree of dispersion of the gas agent B in the liquid A.

To impart reciprocating movement to the liquid A the pressure of the gas agent B (FIG. 2), which is above the liquid, is periodically changed.

As a result, when the pressure of the gas agent increases the liquid moves downwards, when the pressure is released the liquid moves upwards. This reciprocating movement of the liquid can be achieved by other means, for example, by a piston-type pulsator E (FIG. 1), periodically affecting the liquid A directly (not shown in the drawing) or via a special gas agent L, which is not dispersable in the liquid, but serves only as a separating medium between the liquid in the vessel and the pulsator piston.

Figure 3:
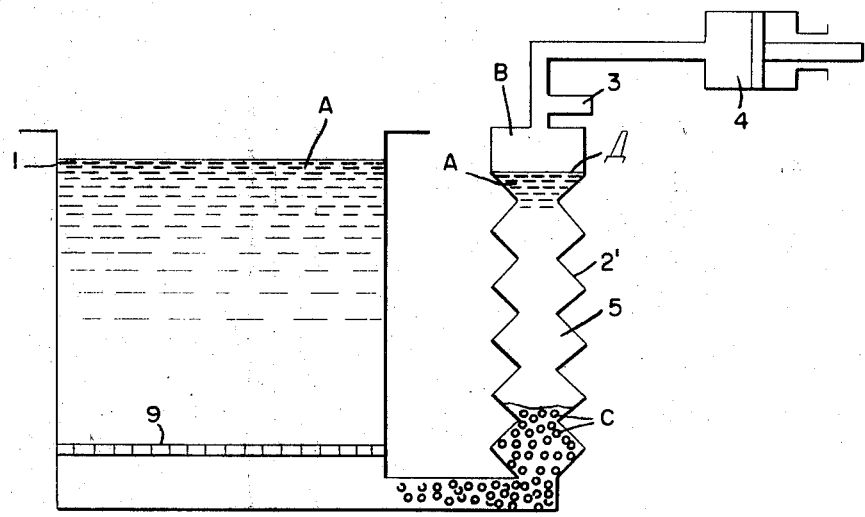
FIG. 3 shows still another embodiment according to the present invention.
Figure 4:
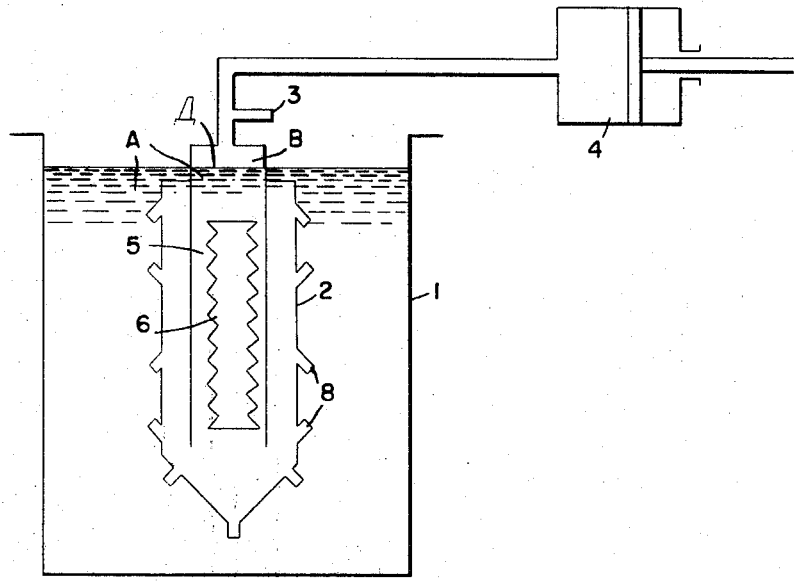
FIG. 4 shows an embodiment of the vessel with a displacer in the device according to the present invention.

When a large volume of liquid is to be aerated, it is more economical (from the point of view of power consumption for creating a reciprocating movement) to impart this movement not to the whole volume of the liquid but only to a restricted portion thereof (FIGS. 2, 3, 4), which, after being dispersed, is mixed with the rest of the liquid.

The mixing and dispersing of the gas agent and liquid by the method described hereinabove is embodied in a device which is essentially a reservoir 1 (FIGS. 2 and 4) provided with an aeration arrangement made as a vessel 2 having inner and outer walls and located in the reservoir 1, which is filled with the liquid A. The vessel 2 has an opening in its bottom which communicates with the reservoir 1 for filling it with the liquid.

In the top portion of the vessel 2 there is an inlet 3 for the gas agent B, supplied to the cavity 5 of the vessel 2. It is also here that the vessel 2 is connected to a piston-type pulsator 4, which periodically changes the gas agent pressure above the surface of the liquid, thus imparting to it a reciprocating movement.

Figure 2:
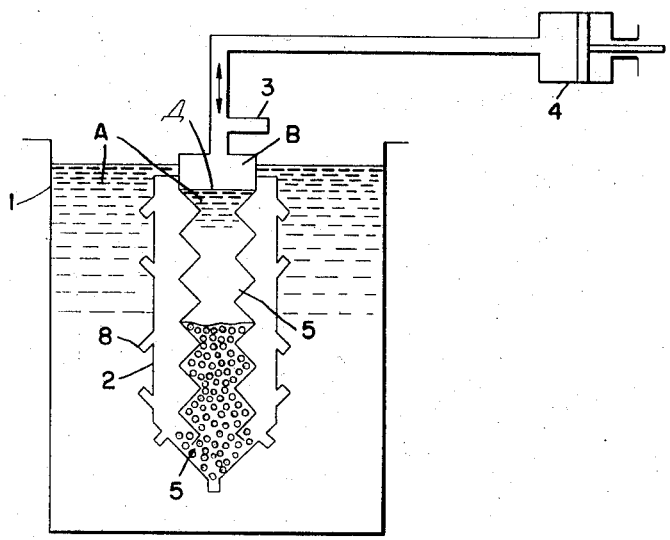

The inner walls of the vessel 2 form the internal cavity 5 with a cross section area changing repeatedly along its length. This changing of the cross-sectional area of the internal cavity 5 of the vessel 2 is achieved by making its inner walls in the shape of corrugations, i.e.: zigzag arrangement (FIG. 2).

The cross-sectional area of the internal cavity 5 of the vessel 2 can be changed by other means, for example, if the vessel 2 (FIG. 4) has smooth inner walls, a displacer 6 is installed in the cavity 5, said displacer having a variable cross section.

When the pulsator 4 is started and the gas agent B is supplied to the vessel 2, pressure and rarefaction pulses of the gas B are generated above the surface D of the liquid A. When the pressure is increased, the level of the liquid A (FIGS. 2, 3, 4) in the vessel 2 is lowered, and when the pressure is reduced, the liquid level returns to the initial position. Owing to the stepped shape of the internal cavity 5 of the vessel 2, the liquid A repeatedly changes the surface D of contact with the gas agent in the course of its reciprocating movement and is intensively mixed therewith, thus forming a finely dispersed gas-liquid emulsion. The rate of dispersion of the gas bubbles in the liquid is determined by the intensity of pulsation, that is, by the speed of the reciprocating movement, and can vary within a wide range depending on the process requirements.

In the case when the aeration arrangement is placed outside the reservoir, it is made as a vessel 2' (FIG. 1 and 3), communicating with the reservoir 1 in its lower portion, thus forming a common reservoir, filled with the liquid A.

In the device shown in FIG. 1, the reciprocating movement is imparted to the whole volume of the liquid A in the reservoir 1, which liquid is dispersed with the gas agent B while raising and lowering in the vessel 2'. With this design of the device, the gas agent is supplied to the vessel 2' through the inlet 7, disposed in the top portion of the vessel, while the pulses imparting the reciprocating movement to the liquid are created by the pulsator E, connected to the reservoir 1 in its top portion.

Additional mixing arrangements may be employed for mixing the aerated liquid, processed in the vessel 2, with the rest of the liquid in the reservoir 1.

Nozzles 8 (FIGS. 2 and 4), located on the outer wall of the vessel 2 are used as these mixing arrangements, these nozzles 8 communicating with the inner cavity 5 of the vessel 2. When the pressure of the gas agent B in the vessel 2 is increased, the aerated liquid formed therein, is forced into the reservoir 1 through the nozzles 8, whereas when the gas pressure is reduced, a new portion of the liquid flows into the cavity of the vessel 2 through the same nozzles 8.

When the aeration vessel 2' (FIG. 3) is disposed outside the reservoir 1, the aerated liquid can be evenly distributed throughout the reservoir section by means of a special distributing grate 9, placed horizontally in the lower portion of the reservoir 1.

We claim:

1. A method of mixing and dispersing a gas and a liquid, said method comprising placing the gas above the liquid and imparting to the liquid, and the surface of contact thereof with the gas, a reciprocating movement, and repeatedly varying the magnitude of the area of the surface of contact of the liquid with the gas during each movement of said liquid by varying the area of confinement of said surface in a zigzag arrangement in the direction of reciprocating movement.

2. A method as claimed in claim 1 wherein the reciprocating movement of the liquid is produced by periodically varying the pressure of the gas.

3. A method as claimed in claim 1 wherein the reciprocating movement is imparted to a portion of the liquid, and the method further comprises mixing the portion with the remainder of the liquid.

4. A device for mixing and dispersing a gas and a liquid, said device comprising: a reservoir for the liquid; an aeration means communicating with said reservoir and including at least one vessel having inner corrugated walls defining a cross-sectional area which repeatedly varies along the length of the cavity; an inlet means for the gas disposed in the top portion of said vessel; said gas and liquid forming a contact surface in said vessel and a pulsator connected to said vessel to alternately vary the pressure in the liquid and produce reciprocal movement of the liquid and said contact surface therein.

5. A device as claimed in claim 4 wherein the reservoir comprises means for intermixing the gas-liquid dispersion obtained in the vessel with the remaining liquid in the reservoir.

6. A device as claimed in claim 5 wherein said means for intermixing the gas-liquid dispersion with the remaining liquid in the reservoir comprises nozzles in said vessel providing communication between the cavity and the interior of the reservoir.